(12) United States Patent
Pruden et al.

(10) Patent No.: US 8,911,026 B2
(45) Date of Patent: Dec. 16, 2014

(54) VARIABLE LUG INSERT FOR WHEEL OPENING

(76) Inventors: Rick Pruden, Torrance, CA (US); Arthur Hale, Jr., Long Beach, CA (US)

( * ) Notice: Subject to any disclaimer, the term of this patent is extended or adjusted under 35 U.S.C. 154(b) by 146 days.

(21) Appl. No.: 13/172,447

(22) Filed: Jun. 29, 2011

(65) Prior Publication Data

US 2013/0002006 A1 Jan. 3, 2013

(51) Int. Cl.
*B60B 3/16* (2006.01)
*B60B 3/14* (2006.01)

(52) U.S. Cl.
CPC . *B60B 3/145* (2013.01); *B60B 3/16* (2013.01); *B60B 2310/316* (2013.01); *B60B 2900/115* (2013.01); *B60B 2900/116* (2013.01)
USPC .................. 301/35.632; 301/35.621

(58) Field of Classification Search
USPC ............. 301/35.621, 35.626, 35.627, 35.629, 301/35.631, 35.632
See application file for complete search history.

(56) References Cited

U.S. PATENT DOCUMENTS

| | | | | |
|---|---|---|---|---|
| 2,407,749 A | * | 9/1946 | Sinclair | 301/35.626 |
| 3,749,450 A | * | 7/1973 | Senter et al. | 301/35.631 |
| 3,779,610 A | * | 12/1973 | Pansky et al. | 301/35.631 |
| 3,857,611 A | * | 12/1974 | Pansky et al. | 301/35.631 |
| 3,869,174 A | * | 3/1975 | Brown et al. | 301/35.629 |
| 3,871,708 A | * | 3/1975 | Richter | 301/35.629 |
| 4,679,860 A | * | 7/1987 | Koishi et al. | 301/35.632 |
| 4,708,397 A | * | 11/1987 | Weinmann | 301/35.632 |
| 7,287,819 B2 | * | 10/2007 | McNeil | 301/35.629 |
| 8,308,247 B2 | * | 11/2012 | Kazmierzak | 301/35.632 |
| 2002/0130548 A1 | * | 9/2002 | Gilley et al. | 301/35.631 |
| 2004/0222687 A1 | * | 11/2004 | Kogure et al. | 301/35.631 |
| 2006/0103230 A1 | * | 5/2006 | Wu | 301/35.631 |
| 2008/0067860 A1 | * | 3/2008 | Van Houten | 301/35.632 |

FOREIGN PATENT DOCUMENTS

| | | | | |
|---|---|---|---|---|
| JP | 54099203 U | * | 7/1979 | |
| JP | 62163801 A | * | 7/1987 | ............... B60B 3/16 |
| WO | WO 2011000070 A1 | * | 1/2011 | |

* cited by examiner

*Primary Examiner* — Kip T Kotter
*Assistant Examiner* — Jean Charleston
(74) *Attorney, Agent, or Firm* — Christie, Parker & Hale, LLP

(57) ABSTRACT

A wheel assembly configured for attachment to a vehicle via a plurality of wheel studs or holes, the wheel assembly including a wheel defining a plurality of wheel openings therethrough, wherein each of the wheel openings has a non-circular shape and is configured to receive a wheel stud or bolt; and a plurality of variable lug inserts, wherein one of the variable lug inserts is within each of the openings and wherein each variable lug insert comprises a body having a longitudinal cross-sectional shape generally corresponding to the non-circular shape of the wheel opening and a variable lug insert opening extending through the body.

15 Claims, 6 Drawing Sheets

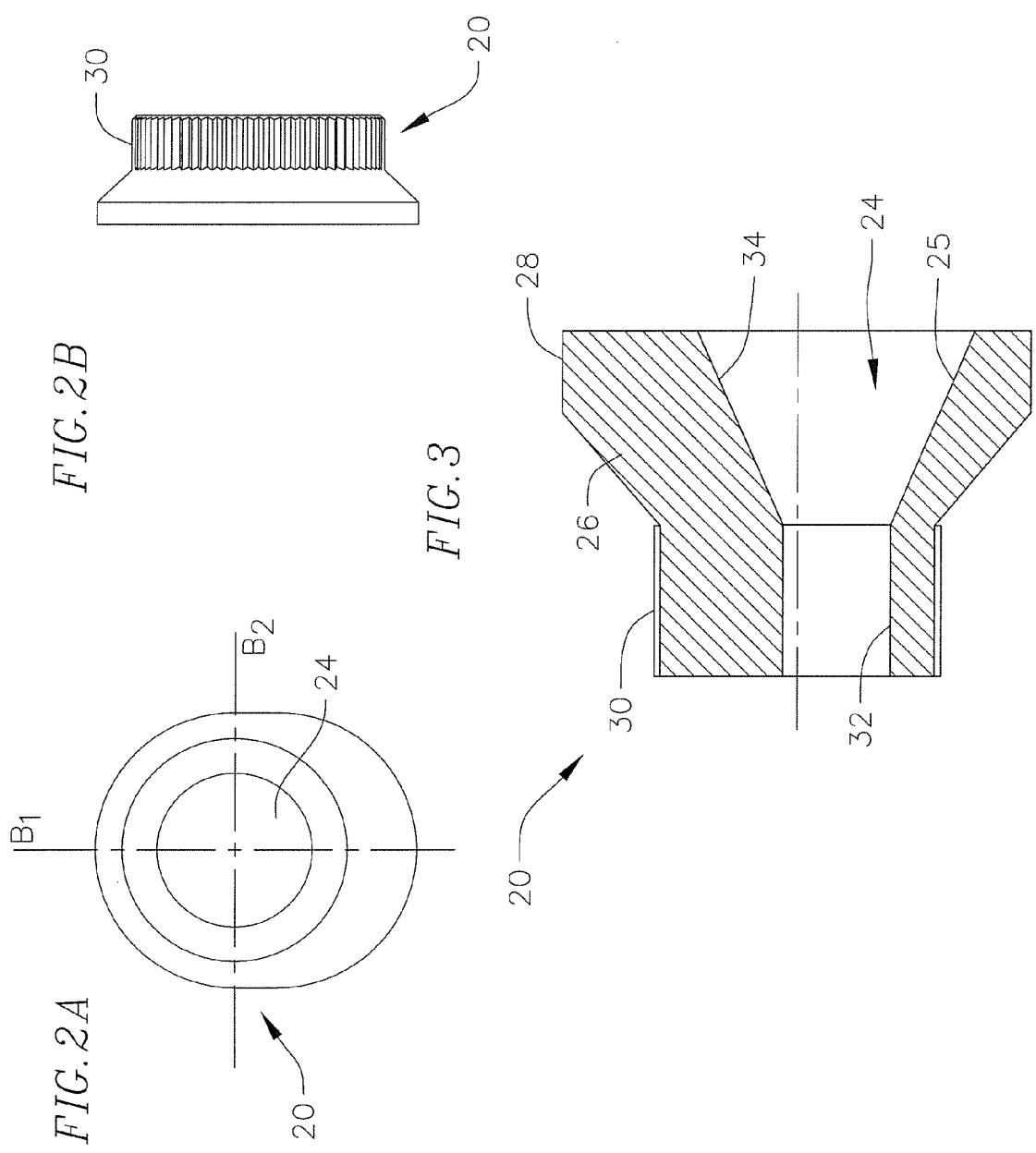

VARIABLE LUG INSERT FOR WHEEL OPENING

BACKGROUND

Wheeled vehicles, such as automobiles and trucks, often include threaded wheel studs protruding from a hub coupled to an axle and configured to allow attachment of a wheel thereto. Usually, the wheel includes openings configured to be aligned with the wheel studs so that the wheel can slide onto the wheel studs and be coupled thereto by lug nuts threaded onto the wheel stud thread. Alternatively, some vehicles have threaded holes for lug bolts.

Typically, a hub will include 5, 6, or 8 wheel studs spaced along the perimeter of a circle centered on the vehicle hub. The openings that are drilled or punched into the wheel to accommodate the wheel studs are sized to fit relatively snugly over the wheel stud to minimize movement of the wheel with respect to the hub and to thereby avoid misalignment of the wheel with respect to the axle. Although the wheel studs stemming from a single hub are generally uniform, the studs or threaded holes may be arranged in different configurations among hubs having the same number of wheel studs. More specifically, depending on the make and model of the vehicle, the distance between the center of the hub and each wheel stud (i.e., the diameter of the circle on which the wheel studs are arranged or pitch circle diameter) may vary. While the diameter of a typical wheel stud is about 12 to 14 mm, the distance between the center of the hub and each wheel stud may vary. Accordingly, wheels adapted to fit onto a hub must not only have openings that match the number of wheel studs or threaded holes, but also that match the specific configuration of the wheel studs, i.e., match the radius of the circle on which the wheel studs or threaded holes are arranged.

Because the openings on the wheel are sized to loosely fit over the wheel studs, a wheel designed to fit onto a hub with, for example, six wheel studs on a 5.5 inch (139.7 mm) diameter circle would not necessarily fit onto a hub with six wheel studs on a 5.315 inch (135 mm) diameter circle. As such, wheel blanks must be customized for each different hub configuration of wheel studs, which can lead to wasted inventory and/or delay.

SUMMARY

According to an embodiment of the present invention, a wheel assembly configured for attachment to a vehicle via a plurality of wheel studs is provided, the wheel assembly including a wheel defining a plurality of wheel openings therethrough, wherein each of the wheel openings has a non-circular shape and is configured to receive a wheel stud; and a plurality of variable lug inserts, wherein one of the variable lug inserts is within each of the wheel openings and wherein each variable lug insert comprises a body having a longitudinal cross-sectional shape generally corresponding to the non-circular shape of the wheel opening and a variable lug insert opening extending through the body.

In one embodiment, the wheel assembly of claim 1, wherein each of the variable lug inserts has a tapered section between a first cylindrical section and a second cylindrical section, and the second cylindrical section may have a roughened surface. Further, in one embodiment, a center of the variable lug insert opening of each variable lug insert is offset from a longitudinal axis bisecting the respective variable lug insert. More specifically, in a first wheel variable lug insert the variable lug insert opening is offset by a first distance and in a second wheel variable lug insert the variable lug insert opening is offset by a second distance different from the first distance.

In one embodiment, each of the variable lug inserts is coupled to the wheel by an interference fit and the variable lug insert opening may be partially tapered. Additionally, an area of the wheel opening substantially matches an area of an outer perimeter of each of the variable lug inserts.

In another embodiment, a wheel variable lug insert is provided including a body having a first cylindrical section, a second cylindrical section and a tapered section between first cylindrical section and the second cylindrical section, wherein the body has an opening extending through the body and wherein a center of the opening is offset from a longitudinal axis bisecting the body.

In yet another embodiment, a set of wheel variable lug inserts configured to be inserted into a wheel opening is provided, each of the wheel variable lug inserts including a body having a first cylindrical section, a second cylindrical section and a tapered section between first cylindrical section and the second cylindrical section, wherein the body has an opening extending through the body, and wherein in a first wheel variable lug insert of the wheel variable lug inserts, a center of the opening is located at a first location along a longitudinal axis of the body and in a second wheel variable lug insert of the wheel variable lug inserts, the opening is located at a second location along the longitudinal axis different from the first location.

Also provided is a method for coupling a wheel to a vehicle, the vehicle having a plurality of wheel studs protruding from a wheel hub, the method including forming a plurality of non-circular wheel openings in a wheel blank to create a wheel; inserting a wheel variable lug insert into each of the wheel openings, the wheel variable lug insert comprising a body having a non-circular lateral cross-sectional area and a variable lug insert opening; sliding the wheel onto the wheel hub such that the wheels studs protrude from the variable lug insert openings; and threading a lug nut or lug bolt onto each wheel stud.

BRIEF DESCRIPTION OF THE DRAWINGS

FIG. 2A is a front view of an exemplary wheel variable lug insert of the wheel assembly of FIG. 1.

FIG. 2B is a side view of the wheel variable lug insert of FIG. 2A.

FIG. 3 is a schematic side cross-sectional view of the wheel variable lug insert of FIG. 2.

DETAILED DESCRIPTION

In general, embodiments of the present invention are directed to a wheel variable lug insert for a vehicle wheel. The wheel variable lug insert is configured to be housed in a wheel opening, the wheel opening being adapted to accommodate a wheel stud extending from a hub of a vehicle and, depending on which of a set of wheel variable lug inserts are accommodated in the openings, the wheel can be customized to fit on wheel stud configurations of different vehicle makes and models. A lug nut can be coupled to the wheel stud accommodated in the wheel opening to couple the wheel to the wheel stud and thereby attach the wheel to a vehicle. In embodiments, the wheel opening is generally a non-circular shape, such as ovular, and has an area significantly larger than an area of a longitudinal cross-section of the wheel stud. The variable lug insert has an outer diameter that is substantially equal to or slightly smaller than a diameter of the ovular wheel opening and an inner diameter that is substantially equal to or slightly larger than a diameter of the wheel stud. The inner diameter defines a variable lug insert opening through which the wheel stud is accommodated and, in one embodiment, such opening is offset from a center of the variable lug insert. Accordingly, depending on which set of variable lug inserts is used, a wheel can be adapted to fit wheel studs arranged in a specific configuration on the hub without drilling additional holes in the wheel or without customizing each wheel blank to fit a particular wheel stud configuration. In other words, when a wheel is created by drilling holes in a wheel blank, that wheel can be used on many different types of vehicles in connection with variable lug inserts of the present invention, as described in more detail below.

Figure 1:
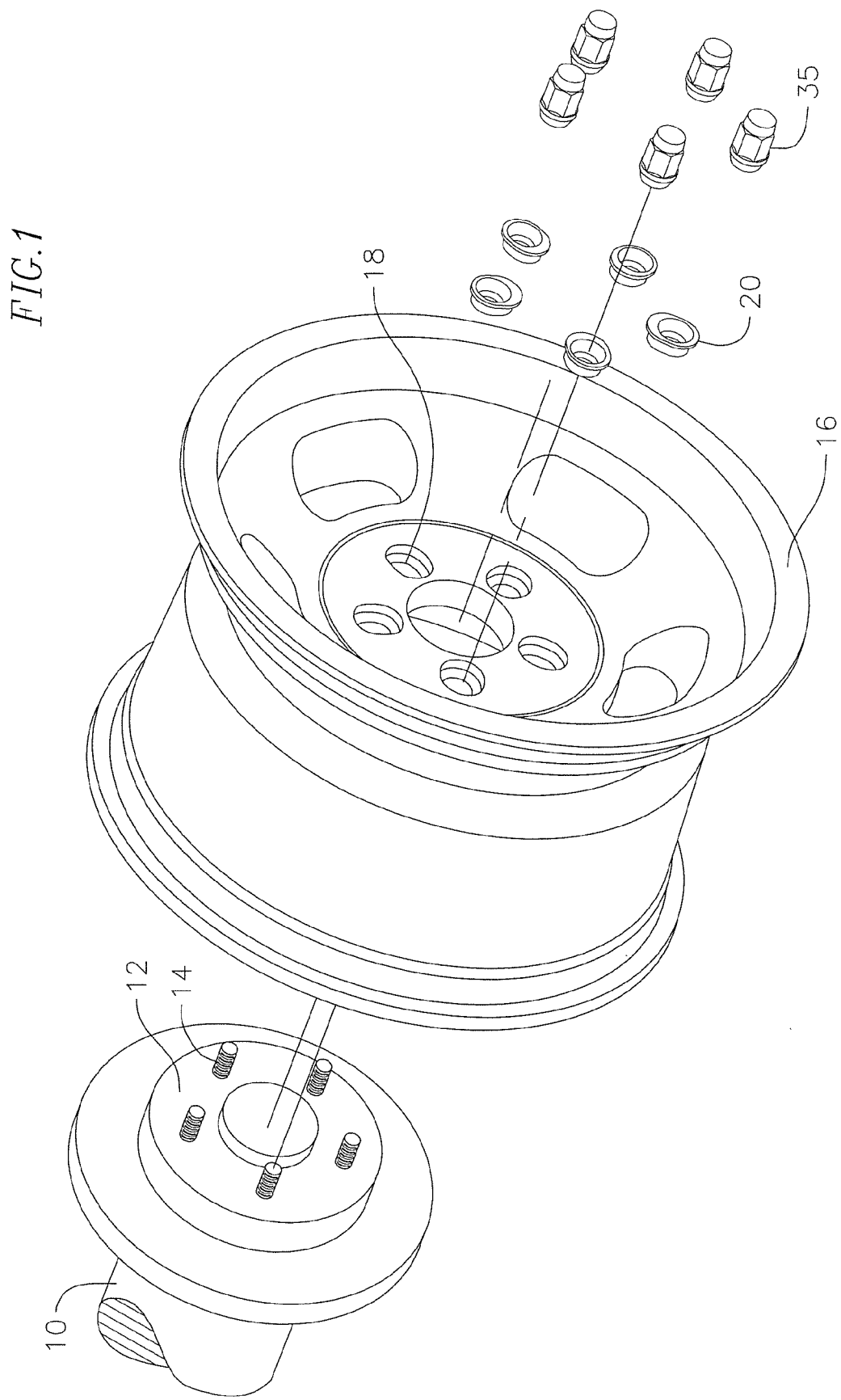
FIG. 1 is an exploded view of an exemplary wheel assembly according to an embodiment of the present invention.

With reference now to FIG. 1, an axle 10 of a vehicle configured to accommodate a wheel terminates in a hub 12. A plurality of wheel studs 14 protrude from the hub 12, the wheel studs typically being at least partially threaded to allow a lug nut to be coupled thereto and thereby couple a wheel to the hub as is well known. In one embodiment, the wheel studs 14 are arranged on the hub 12 in a configuration such that each wheel stud lies on the perimeter of a circle centered on the hub. In other words, each of the wheel studs 14 is located at substantially an equal distance from the center of the hub 12. Depending on the make and model of the vehicle, the number of wheel studs 14 may vary from five to eight and the distance of each wheel stud from the center of the hub 12 may vary as well. However, it will be appreciated that the present invention is not limited by the number of wheel studs per hub nor by the distance of the wheel studs from the center of the hub.

A wheel 16 is configured to be coupled to the hub 12 by accommodating each of the wheel studs 14 through the openings 18 of the wheel. Wheel blanks (i.e., wheels without openings therein) are manufactured as is well known in the art and then the openings 18 are punched, drilled, or otherwise created in the wheel blank. Typically, the number of openings 18 created in the wheel 16 corresponds to the number of wheel studs 14 and, conventionally, the size of openings 18 generally corresponds to the diameter and shape of the wheel studs (i.e., the openings 18 are circular and are sized to fit relatively closely over the wheel studs). Accordingly, when the wheel 16 is coupled to the wheel studs 14 by lug nuts, significant movement between the wheel and wheel studs, and therefore, between the wheel and the wheel hub 12, can be prevented.

Figure 4:
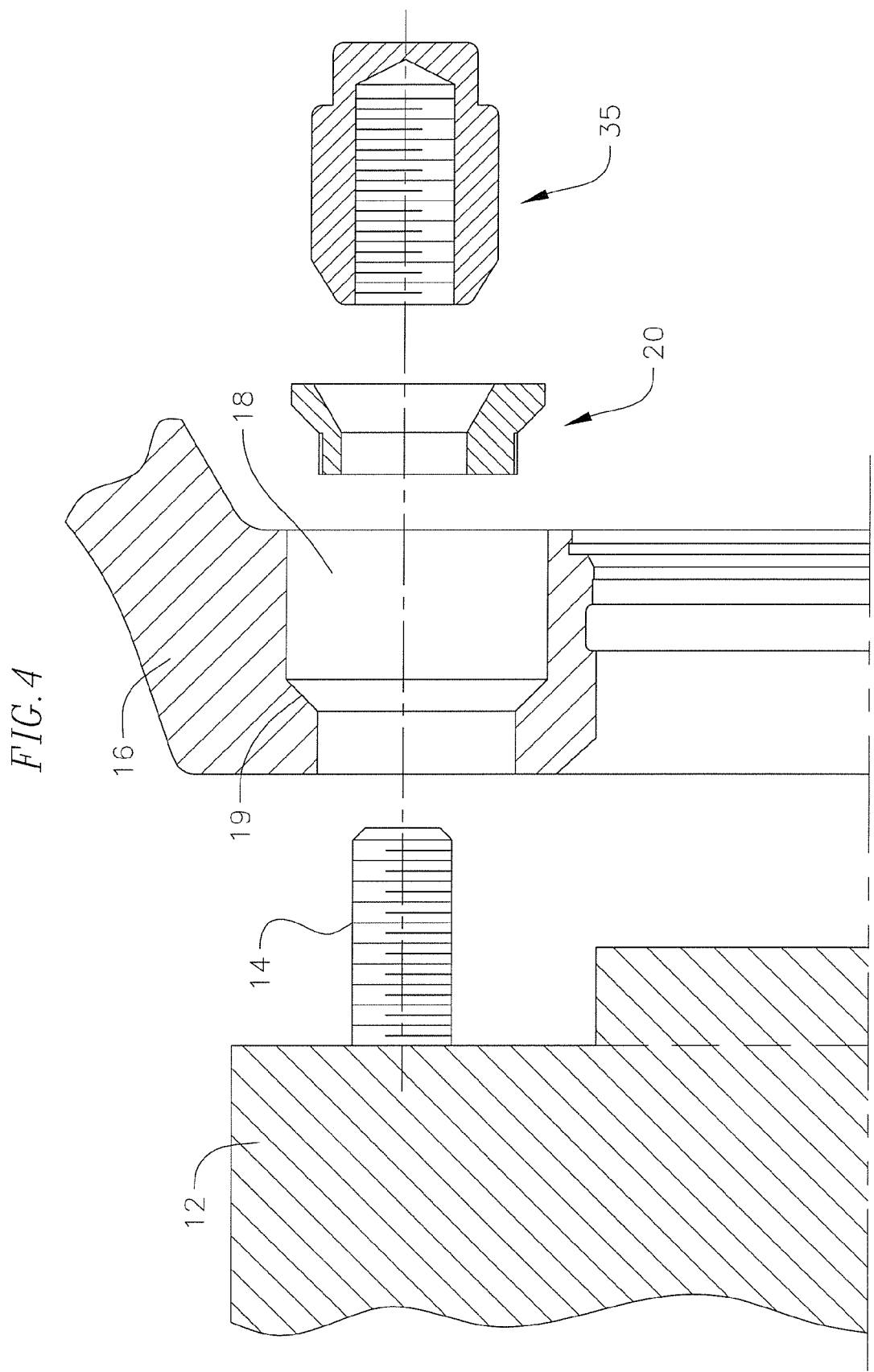
FIG. 4 is an exploded schematic side cross-sectional view of a portion of the wheel assembly of FIG. 1.
Figure 6:
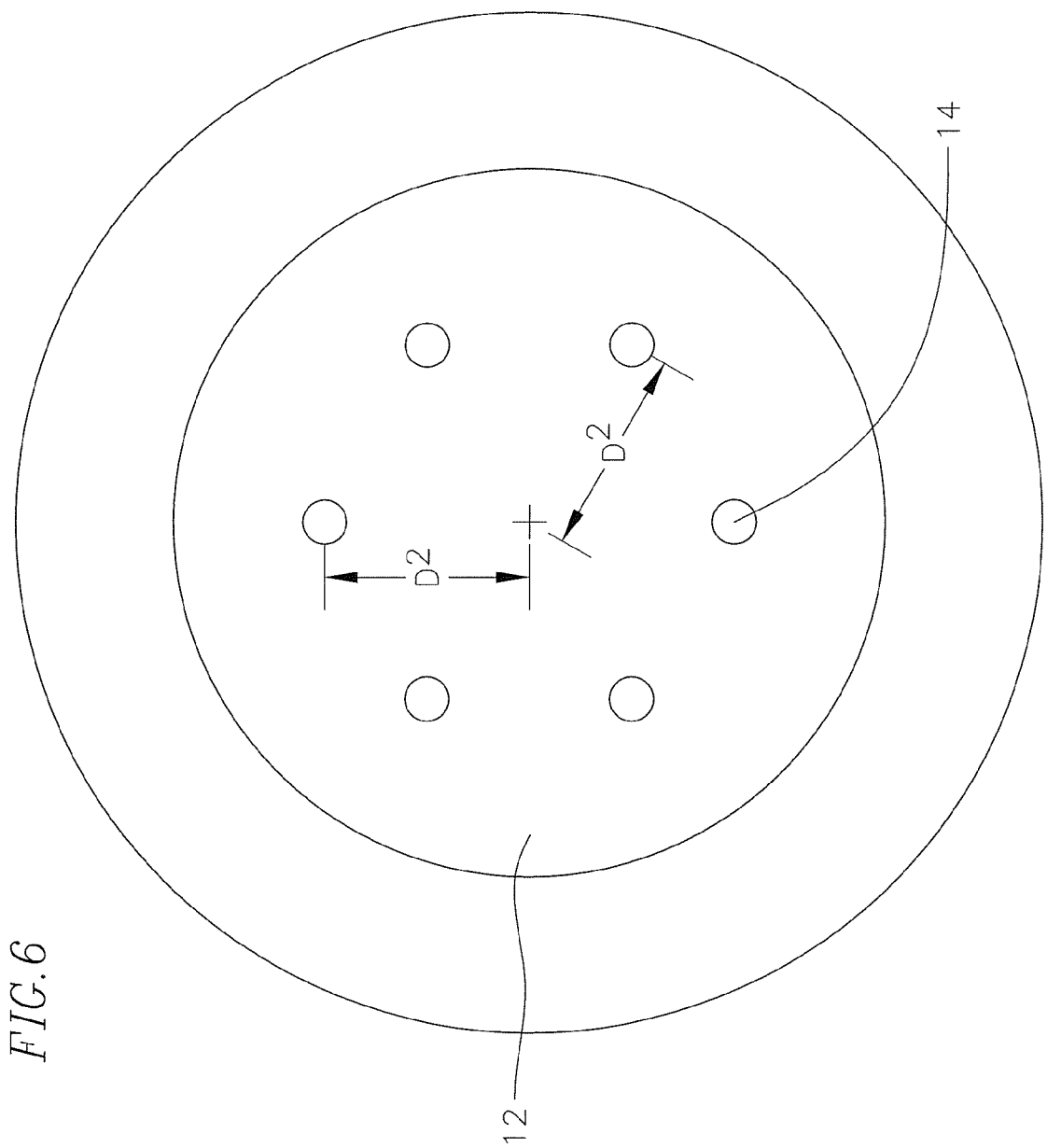
FIG. 6 is a schematic front view of a hub having wheel studs protruding therefrom.

According to embodiments of the present invention and with reference also to FIGS. 4 and 6, the openings 18 in the wheel 16 are generally ovular and have an area that is substantially larger than a longitudinal cross-sectional area of the wheel stud 14, and specifically an area large enough to accommodate common wheel stud radius configurations. As shown in FIG. 6, each ovular opening 18 has a long axis $A_1$ generally bisecting the opening vertically and a short axis $A_2$ generally bisecting the opening horizontally. Accordingly, the opening 18 is able to accommodate wheel studs 14 over a range of spacing from the center of the hub 12. In one embodiment, the opening 18 has a maximum width of about 1.12 inches and a maximum height of about 1.30 inches, but it will be appreciated that the opening is not limited to these dimensions nor to any particular shape. Additionally, the openings 18 may have an outwardly tapered section 19 (FIG. 4) to accommodate a wheel variable lug insert 20, as described in more detail below.

As noted above, the wheel studs 14 of a hub 12 are conventionally accommodated through the openings of a wheel 16 and then the wheel is coupled to the wheel studs by threading lug nuts onto the wheel studs. Because the wheel studs 14 of different makes and models of vehicles can be spaced by different distances from the center of the hub 12, different wheel blanks are required to be drilled with holes spaced in various configurations, depending on the vehicle for which the wheel will be used. More specifically, even for different vehicles having the same number of wheel studs, the wheel blanks need to be customized for each vehicle to accommodate the various distance differences between the wheel studs. However, embodiments of the present invention allow for wheel blanks to be used for different wheel stud configurations, thereby eliminating the need for customized wheel blanks or specific wheels for each vehicle.

With reference now to FIGS. 2A-4, embodiments of the present invention provide for a variable lug insert 20 configured to be accommodated within each opening 18 of the wheel 16. In one embodiment, the variable lug insert 20 comprises a body 22 with a variable lug insert opening 24 extending therethrough. A portion of the body 22 is generally shaped to correspond to a shape of the opening 18 in the wheel 16 and, in one embodiment, the body includes a tapered section 26 between a first cylindrical section 28 and a second cylindrical section 30, wherein the first cylindrical section has a greater outer diameter than the second cylindrical section. In one embodiment, the variable lug insert 20 is configured to be coupled to the wheel 16 by an interference fit, but is not limited thereto. As shown in FIG. 2A, the variable lug insert may have a long axis $B_1$ generally bisecting the opening vertically and a short axis $B_1$ generally bisecting the opening horizontally, similar to the opening 18. As also shown in FIGS. 5A-5E, the opening 24 can be located at different locations along the long axis $B_1$ to allow a wheel 16 to be configured to fit to different wheel stud configurations. Additionally, because the variable lug insert 20 and the opening 18 are non-circular shapes, rotation of the variable lug insert within the opening can be prevented even when a relatively large torque is applied, such as when a lug nut 35 is tightened onto the wheel stud 14.

The second cylindrical section 30 is configured to be the "leading" section when the variable lug insert is inserted into the opening 18, i.e., the variable lug insert 20 is inserted into the opening such that the second cylindrical section 30 enters the opening first. In one embodiment, the outer surface of the second cylindrical section 30 is knurled or otherwise roughened or textured to provide increased coupling strength when the variable lug insert 20 is inserted into the opening. As shown in FIG. 4, the second cylindrical section 30 is sized to fit snugly within the opening 18 to be coupled to the wheel 16 by an interference fit. The fit between the variable lug insert 20 and the wheel 16 should be tight enough to prevent the variable lug insert from becoming dislodged under normal operating conditions of the wheel but, in one embodiment, the fit is not a permanent coupling so that the variable lug insert can be removed from the wheel if sufficient force is applied.

The tapered section 26 of the variable lug insert 20 generally corresponds to and is configured to fit within the tapered section 19 of the opening 18. The abutting tapered sections 19, 26 help secure the variable lug insert within the opening 18 and allow the variable lug insert 20 to be inserted to an appropriate location within the opening 18. The first cylindrical section 28 extends from the tapered section 26.

The variable lug insert opening 24 extends through the body 22 of the variable lug insert 20 and is generally Y-shaped in cross-section, having a constant diameter section 32 and a tapered section 34 generally configured to accommodate a beveled edge of a lug nut 35. As shown in FIG. 3, the variable lug insert opening 24 can be oriented on the variable lug insert body 22 so that when the variable lug insert is in the wheel opening 18, the distance from the center of the wheel 16 to the opening is substantially equal to the distance from the center of the hub 12 to each wheel stud 14. In other words, the variable lug insert opening 24 is located to correspond to the wheel stud or threaded hole 14 to allow the wheel 16 to be attached to the vehicle. Accordingly, depending on the make and model of the vehicle, an appropriate variable lug insert 20 can be selected such that the variable lug insert opening is located at a distance from the center of the wheel that generally corresponds to each wheel stud.

Figure 5:
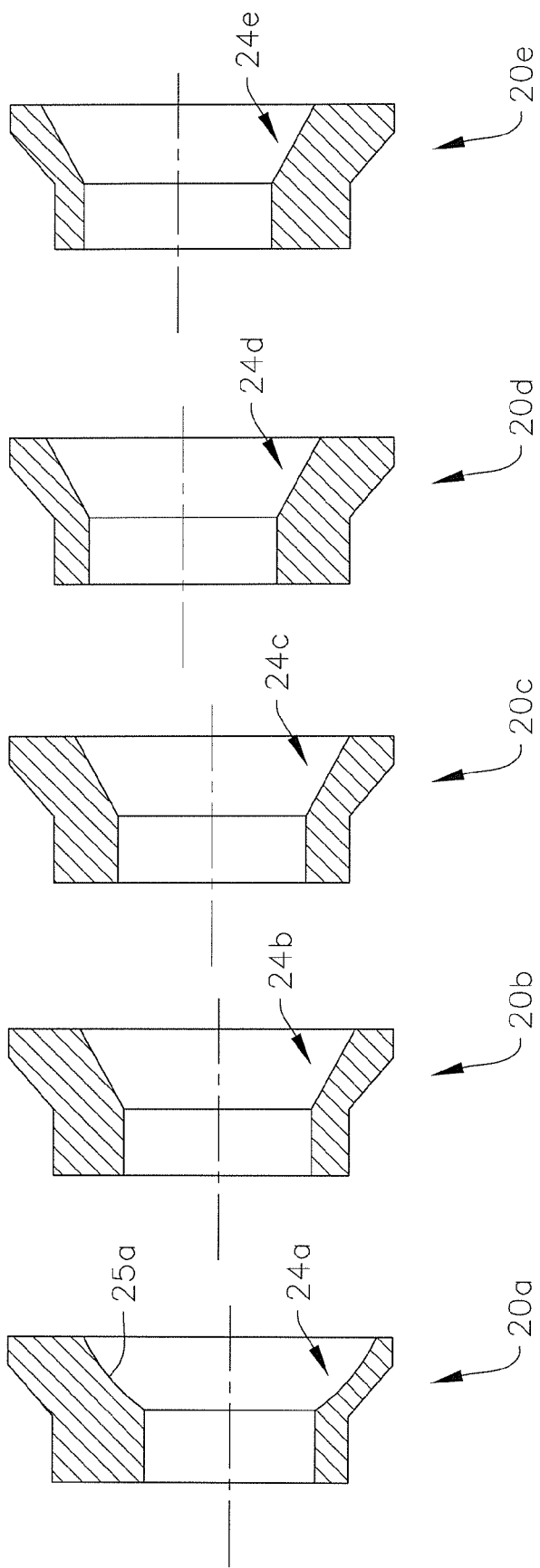
FIGS. 5A, 5B, 5C, 5D, and 5E are schematic side cross-sectional views of exemplary wheel variable lug inserts of the present invention.

With reference now to FIGS. 5A-5E, different embodiments of a wheel variable lug insert 20a-20e are shown. As can be seen in the figures, an exterior surface of all of the wheel variable lug inserts is substantially identical. However, the variable lug insert openings 24a-24e are located in varying positions with respect to the exterior surface, and more specifically, the openings are centered at varying distances from the exterior surface along the long axis of the variable lug insert. As will be appreciated, the location of the openings 24a-24e allows for the opening to be located by a specific distance from a center of a wheel 16 into which the variable lug insert 20a-20e is inserted. As such, an appropriate set of variable lug inserts 20 can be chosen to allow the wheel 16 to be accommodated by a specific wheel stud configuration. Additionally, as shown in FIG. 5A, an angled surface 25a of the variable lug insert 20a can be rounded to accommodate a lug nut with a rounded edge. As will be appreciated, the shape of the variable lug insert opening 24 is not limited to those shown, but rather may be any suitable shape configured to accommodate a wheel stud 14 and a lug nut 35 or lug bolt, including a variable lug insert opening with a constant diameter.

When the wheel 16 having the variable lug insert 20 coupled thereto is placed on the wheel studs 14, the wheel is attached to the wheel studs by a lug nut or lug bolt 35 corresponding to each wheel stud or through hole. With reference to FIG. 4, lug nuts 35 usually have a beveled leading edge that generally corresponds to an angled interior surface defined by the opening 18. Because the variable lug insert 20 now occupies the opening 18, the variable lug insert opening 24 defines an angled interior surface to accommodate the beveled edge 34 of each lug nut 32 or lug bolt.

Figure 7:
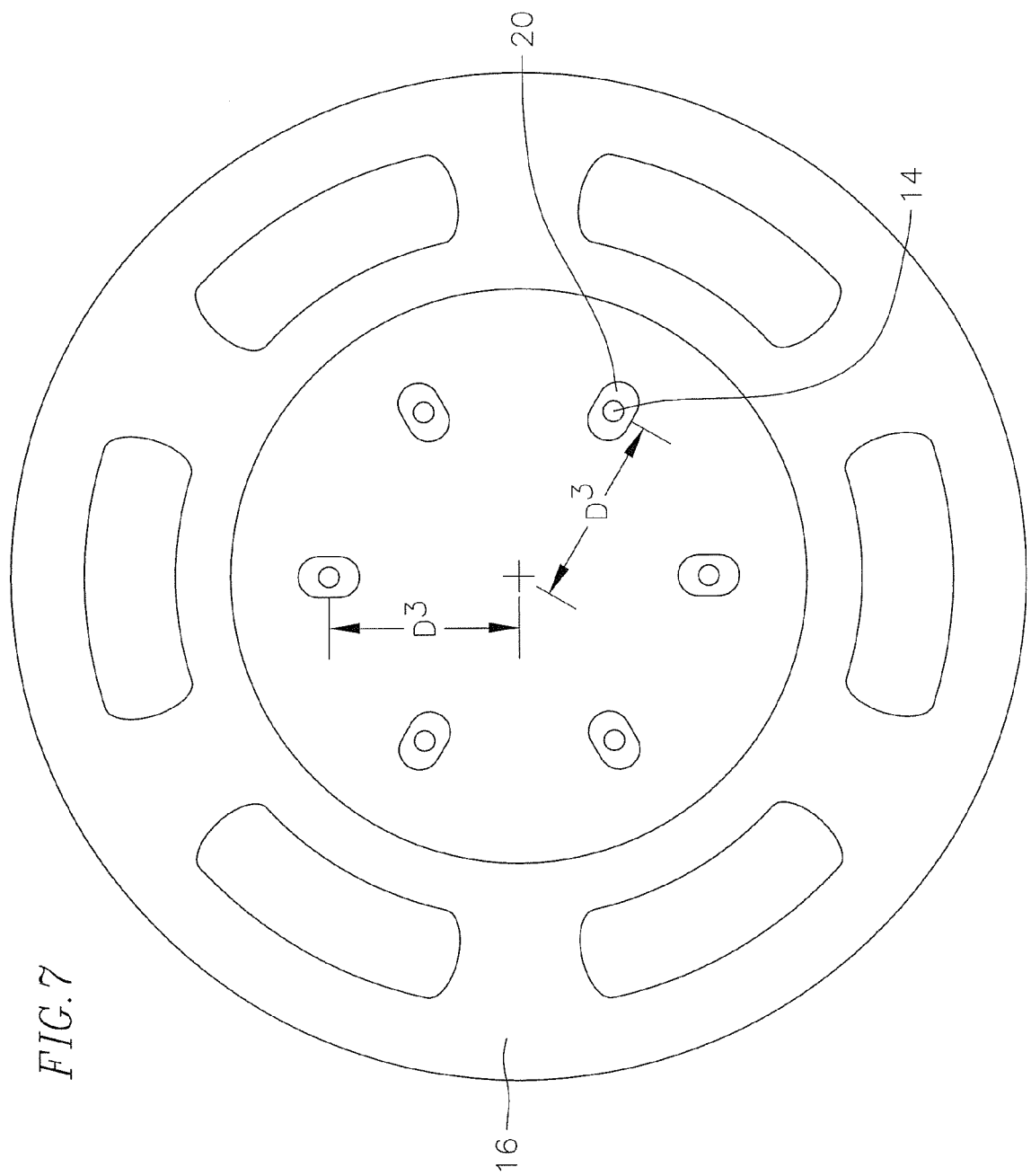
FIG. 7 is a schematic front view of a wheel accommodating wheel variable lug inserts according to an exemplary embodiment of the present invention.

An exemplary use of the variable lug inserts 20 will now be described with reference to the figures. With reference to FIG. 1, an exemplary wheel blank has been formed with five ovular openings 18 to create the wheel 16. Each of the wheel openings 18 is located by an equal distance from a center of the wheel, thereby locating the openings on a perimeter of a circle centered on the wheel 16. As noted above, the wheel openings 18 are sized to be significantly larger than a longitudinal cross-sectional area of each wheel stud 14. In order to determine which set of variable lug inserts 20 to use in the wheel 16, the distance $D_2$ (FIG. 6) from the center of the hub 12 to a center of each wheel stud 14 is measured. Once the distance $D_2$ has been determined, an appropriate variable lug insert 20 is then inserted into each of the openings 18, an appropriate variable lug insert being one having a center of its variable lug insert opening 24 being substantially an equal distance $D_3$ (FIG. 7) from the center of the wheel as the distance $D_2$ between the center of the hub and the center of the wheel stud.

Each variable lug insert 20 is coupled to the wheel 16 by engaging at least the second cylindrical section 30 to the interior surface of the wheel defining the wheel opening 18. In one embodiment, a press can be used to force the variable lug inserts 20 into respective openings 18 in the wheel. The press can have an impact surface about equal to or greater than an area of the variable lug insert 20 so that an equal pressure is applied to the perimeter of the variable lug insert to ensure that the variable lug insert is inserted orthogonally and not at an angle. Once the variable lug inserts 20 are in place, the wheel 16 can be placed onto the vehicle by matching each variable lug insert opening 24 with a corresponding wheel stud 14. Then, a lug nut 35 or lug bolt can be threaded onto each wheel stud or hole 14 to attach the wheel 16 to the vehicle.

If it becomes necessary or desirable to use the same wheel 18 on another vehicle of a different make or model having a different distance $D_2$ between the center of the hub 12 and each wheel stud 14, the first set of variable lug inserts 20 may be removed from the wheel and a second set of variable lug inserts may be inserted such that a distance $D_3$ between the center of the wheel and the center of each variable lug insert opening 24 matches the wheel stud distance $D_2$. As will be appreciated, this process may be repeated as many times as necessary with the same wheel. Accordingly, because the same wheel can be used on multiple vehicle makes and models, a wheel inventory can be optimized and the wheels can be quickly customized for a vehicle. Additionally, although wheel studs on a hub are typically all located an equal distance from the center of the hub, if the wheel studs are located at different distances, a set of wheel variable lug inserts according to an embodiment of the present invention could be compiled using wheel variable lug inserts wherein the variable lug insert openings of different variable lug inserts are offset from the longitudinal axis bisecting the wheel variable lug insert by different distances.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A wheel assembly configured for attachment to a vehicle via a plurality of wheel studs, the wheel assembly comprising:
   a wheel defining a plurality of wheel openings therethrough, wherein each of the wheel openings has a non-circular shape and is configured to receive a wheel stud; and
   a plurality of variable lug inserts, wherein one of the variable lug inserts is within each of the wheel openings and wherein each variable lug insert comprises a body having a non-circular outermost periphery generally corresponding to the non-circular shape of the wheel opening and a variable lug insert opening extending through the body, wherein each of the variable lug inserts has a tapered section between a first cylindrical section and a second cylindrical section and wherein the second cylindrical section has a roughened surface.

2. The wheel assembly of claim 1, wherein a center of the variable lug insert opening of each variable lug insert is offset from a lateral axis bisecting the respective variable lug insert.

3. The wheel assembly of claim 2, wherein in a first wheel variable lug insert of the wheel variable lug inserts, the variable lug insert opening is offset by a first distance and in a second wheel variable lug insert of the wheel variable lug inserts, the variable lug insert opening is offset by a second distance different from the first distance.

4. The wheel assembly of claim 1, wherein each of the variable lug inserts is coupled to the wheel by an interference fit.

5. The wheel assembly of claim 1, wherein the variable lug insert opening is partially tapered.

6. The wheel assembly of claim 1, wherein the variable lug insert opening is generally Y-shaped.

7. The wheel assembly of claim 1, wherein an area of the wheel opening substantially matches an area of an outer perimeter of each of the variable lug inserts.

8. A wheel variable lug insert comprising a body having a first cylindrical section, a second cylindrical section and a tapered section between first cylindrical section and the second cylindrical section, wherein the second cylindrical section has a roughened surface, wherein the body has an opening extending through the body, wherein a center of the opening is offset from a lateral axis bisecting the body, and wherein a longitudinal cross-section of the wheel variable lug insert is generally non-circular.

9. The wheel variable lug insert of claim 8, wherein the opening is partially tapered.

10. The wheel variable lug insert of claim 8, wherein the opening has a generally Y-shaped longitudinal cross-section.

11. The wheel variable lug insert of claim 8, wherein a lateral cross-section of the wheel variable lug insert is generally ovular.

12. The wheel variable lug insert of claim 8, wherein the opening is sized to receive a wheel stud from a vehicle.

13. A set of wheel variable lug inserts configured to be inserted into a wheel opening, each of the wheel variable lug inserts comprising a body having a first cylindrical section, a second cylindrical section and a tapered section between first cylindrical section and the second cylindrical section, wherein the second cylindrical section has a roughened surface, wherein the body has an opening extending through the body and a longitudinal cross-section of the wheel variable lug insert is non-circular, and wherein in a first wheel variable lug insert of the wheel variable lug inserts, a center of the opening is located at a first location along a longitudinal axis of the body, and wherein in a second wheel variable lug insert of the wheel variable lug inserts, a center of the opening is located at a second location along the longitudinal axis different from the first location.

14. The set of wheel variable lug inserts of claim 13, wherein the first wheel variable lug insert and the second wheel variable lug insert are substantially the same size.

15. The set of wheel variable lug inserts of claim 13, wherein the opening is substantially circular.

* * * * *